Jan. 24, 1928.
M. B. MORGAN
1,657,091
DIFFERENTIAL MECHANISM
Filed July 23, 1927   2 Sheets-Sheet 2
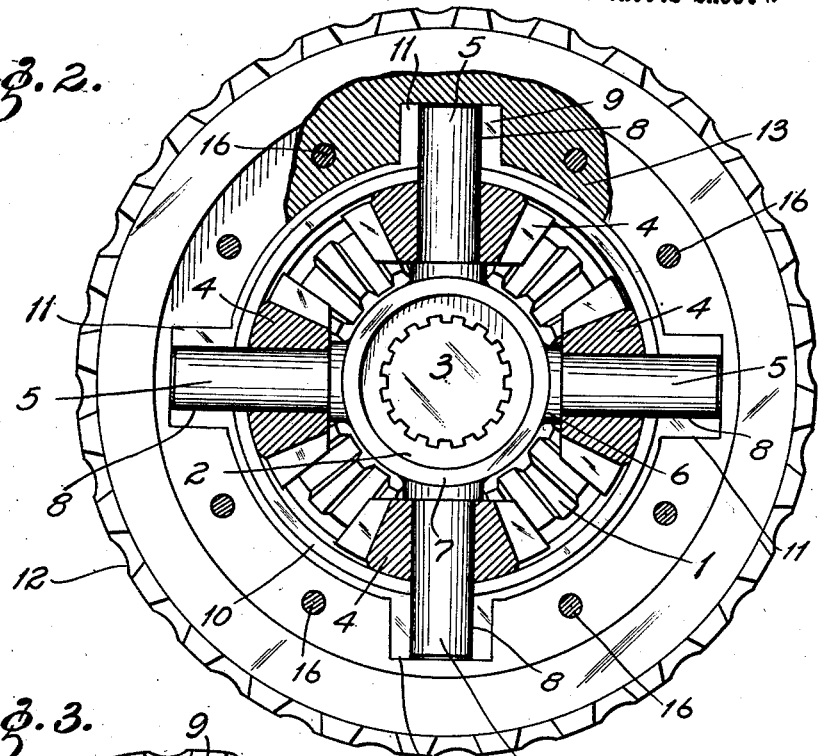
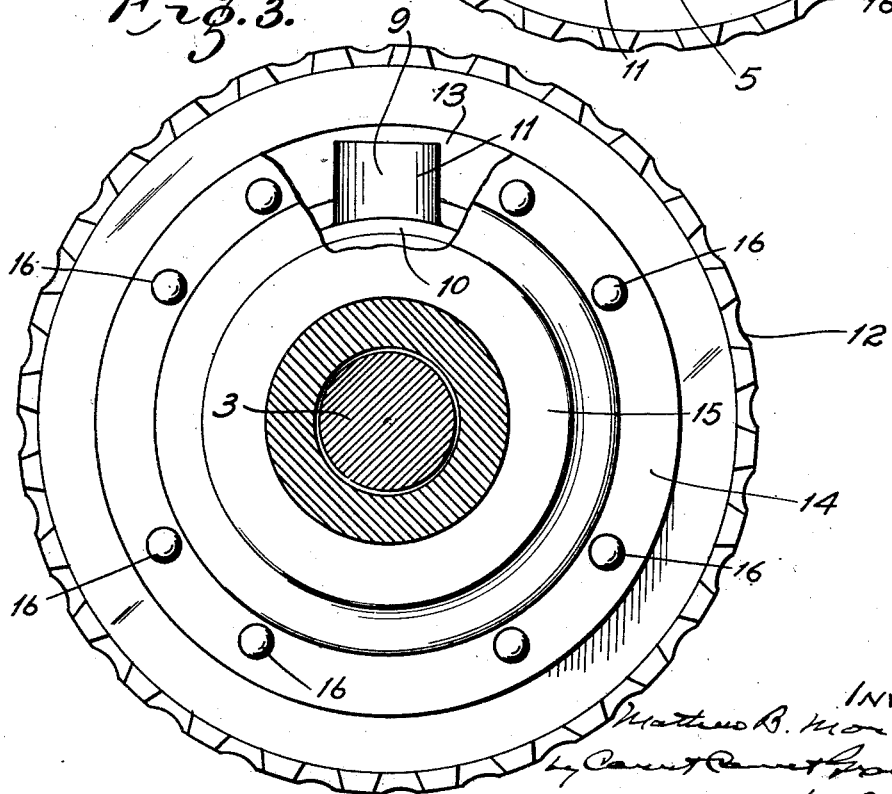

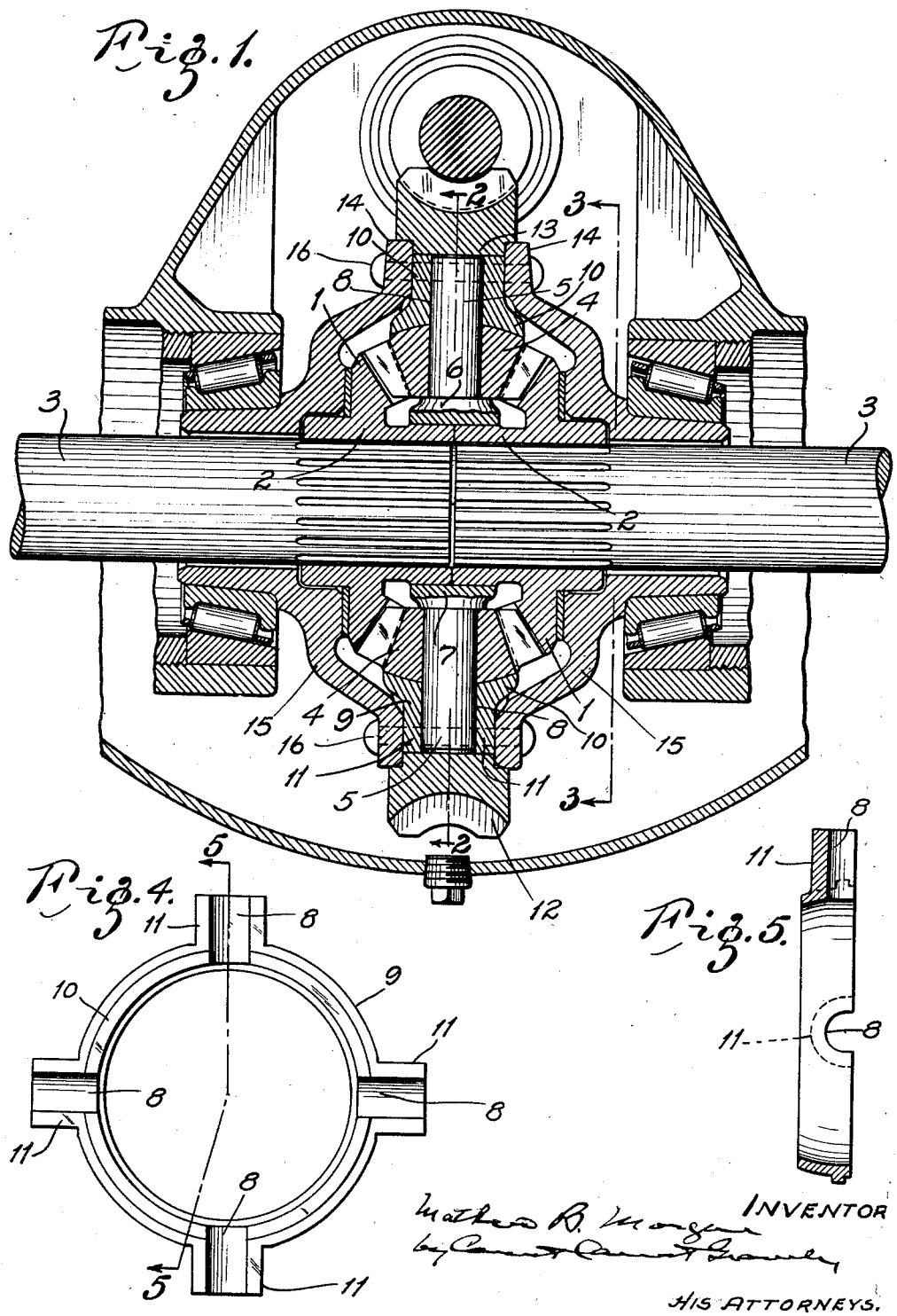

Patented Jan. 24, 1928.

1,657,091

UNITED STATES PATENT OFFICE.

MATHEW B. MORGAN, OF DETROIT, MICHIGAN, ASSIGNOR TO THE TIMKEN-DETROIT AXLE COMPANY, OF DETROIT, MICHIGAN, A CORPORATION OF MICHIGAN.

DIFFERENTIAL MECHANISM.

Application filed July 23, 1927. Serial No. 207,859.

This invention relates to differential mechanism and has for its principal objects to obtain great compactness and rigidity. It consists in the parts and in the arrangements and combinations of parts hereinafter described and claimed.

In the accompanying drawing, wherein like numerals refer to like parts wherever they occur, Fig. 1 is a longitudinal sectional view of my differential mechanism together with adjacent portions of the driving axle construction in which it is mounted.

Fig. 2 is a cross-section of said differential mechanism on the plane indicated by the line 2—2 in Fig. 1.

Fig. 3 is a cross-section on the plane indicated by the line 3—3 in Fig. 1.

Fig. 4 is a side view of one of the sections of the spider carrier; and

Fig. 5 is a cross-section of the spider carrier on the line 5—5 in Fig. 4.

The present construction comprises opposed bevel gears 1 with elongated hubs 2 that are slotted endwise for engagement with splines provided therefor on the respective shaft sections 3. Said construction also comprises bevel pinions 4 that mesh with said bevel gears 1 and are mounted on the radial arms 5 of a spider 6 whose central hub 7 fits over the abutting end portions of the hubs 2 of said bevel gears. The outer ends of the spider arms fit in recesses 8 provided therefor in a support hereinafter designated as the spider carrier 9. This spider carrier comprises two counterpart ring-like members 10 that fit flatwise against each other and which have opposed semi-spherical grooves in their meeting faces arranged to constitute the recesses or seats 8 for the spider arms. These sections are formed with outwardly extended bosses or lugs 11 whose inner faces are recessed in continuation of the recesses 8 in the body portion thereof so as to increase the areal contact between said sections and the spider arms.

The outer end surface of the bevel pinions 4 is spherical and fits in the inner surface of the spider carrier, which is made spherical for this purpose. The spider carrier is inserted in a ring gear 12, preferably a worm gear, which has an inwardly extending flange 13, which is notched or recessed to receive the outwardly projecting lugs of the spider carrier, which lugs fit in said recesses. Each end of the ring gear is counterbored to receive the flanged margins 14 of two hemispherical casing members 15, which are secured together by rivets 16 or the like that pass through said marginal flanges 13 and through the inwardly extending portion of the worm gear. The counterbores of the ring gear are of such depth that said flanges will firmly clamp together the sections of the spider carrier and at the same time firmly clamp the ring gear in position.

In addition to its obvious compactness, my construction is very strong and rigid, and easy to make of great precision. This is due largely to the fact that the spider carrier cooperates directly with all of the spider arms and distributes the driving stress to all of the spider arms equally. The simplicity of the design of the spider carrier members makes it a relatively easy matter to obtain the precision of fit that is required in constructions of this type.

What I claim is:

1. A differential mechanism comprising a gear ring, a spider carrier having projecting portions interlocking with said gear ring, a spider whose arms interlock with said carrier, pinions on said spider, opposed gears engaging said pinions, and casing members clamping said ring gear and said spider carrier in place.

2. A differential mechanism comprising a gear ring, a spider carrier having projecting portions interlocking with said gear ring, a spider whose arms interlock with said carrier, pinions on said spider, opposed gears engaging said pinions, and casing members clamping said ring gear and said spider carrier in place, said spider carrier comprising two counterpart ring sections that fit together flatwise and have radial recesses in their meeting faces to receive the spider arms.

3. A differential mechanism comprising a gear ring, a spider carrier having projecting portions interlocking with said gear ring, a spider whose arms interlock with said carrier, pinions on said spider, opposed gears engaging said pinions, and casing members clamping said ring gear and said spider carrier in place, said spider carrier comprising two counterpart ring sections that fit together flatwise and have radial recesses in their meeting faces and extending through said projecting portions to receive the spider arms.

Signed at Detroit, Michigan, this 20th day of July, 1927.

MATHEW B. MORGAN.